(12) United States Patent
Park et al.

(10) Patent No.: US 7,956,128 B2
(45) Date of Patent: Jun. 7, 2011

(54) THERMOPLASTIC RESIN COMPOSITION FOR REFRIGERATOR HAVING IMPROVED ENVIRONMENTAL STRESS CRACK RESISTANCE

(75) Inventors: Kang Yeol Park, Suwon-si (KR); Hee Jung Park, Guri-si (KR); Jae Hyung Lee, Seoul (KR)

(73) Assignee: Cheil Industries Inc., Gumi-si (KR)

( * ) Notice: Subject to any disclaimer, the term of this patent is extended or adjusted under 35 U.S.C. 154(b) by 166 days.

(21) Appl. No.: 11/769,956

(22) Filed: Jun. 28, 2007

(65) Prior Publication Data

US 2008/0093578 A1 Apr. 24, 2008

Related U.S. Application Data

(63) Continuation-in-part of application No. PCT/KR2005/002035, filed on Jun. 29, 2005.

(51) Int. Cl.
C08C 19/22 (2006.01)
C08F 8/30 (2006.01)
C08G 63/48 (2006.01)

(52) U.S. Cl. .......... 525/71; 525/66; 525/70; 525/86; 525/191; 525/223; 525/234; 525/238; 525/241; 252/67; 252/68; 526/207; 526/335; 526/340.1; 526/341; 526/346; 526/347.1

(58) Field of Classification Search .......... 252/67, 252/68; 525/71, 333.2
See application file for complete search history.

(56) References Cited

U.S. PATENT DOCUMENTS

| 4,250,271 A * | 2/1981 | Morris et al. ............ 525/66 |
| 5,180,779 A | 1/1993 | Kamoshita et al. |
| 2003/0055165 A1 * | 3/2003 | Eichenauer et al. ....... 525/71 |
| 2003/0119986 A1 * | 6/2003 | Eichenauer .............. 525/71 |

FOREIGN PATENT DOCUMENTS

| JP | 2-284906 A | 11/1990 |
| JP | 6-262713 A | 9/1994 |
| JP | 11-279352 A | 10/1999 |
| JP | 11-293085 A | 10/1999 |
| JP | 14-60582 A | 2/2002 |
| KR | 2002-50475 A | 6/2002 |
| KR | 2002-52422 A | 7/2002 |

OTHER PUBLICATIONS

International Search Report for corresponding International Application No. PCT/KR2005/002035 mailed on Oct. 13, 2005.

* cited by examiner

*Primary Examiner* — Vasu Jagannathan
*Assistant Examiner* — Robert C Boyle
(74) *Attorney, Agent, or Firm* — Summa, Additon & Ashe, P.A.

(57) ABSTRACT

A thermoplastic resin composition for a refrigerator according to the present invention can include (A) about 20 to about 40 parts by weight of an acrylonitrile-butadiene-styrene graft copolymer resin prepared by grafting in emulsion polymerization about 60 to about 30% by weight of a monomer mixture comprising a cyanide vinyl compound and an aromatic vinyl compound to about 40 to about 70% by weight of a rubber polymer having an average particle size of about 0.1 to about 0.4 µm; (B) about 1 to about 20 parts by weight of a styrenic copolymer comprising ($b_1$) about 0 to about 75% by weight of a styrenic copolymer prepared by copolymerizing about 5 to about 20% by weight of a rubber polymer having an average particle size of about 0.1 to about 10 µm, about 10 to about 30% by weight of a cyanide vinyl compound, and about 65 to about 85% by weight of an aromatic vinyl compound, and ($b_2$) about 25 to about 100% by weight of a styrenic copolymer prepared by copolymerizing about 5 to about 20% by weight of a rubber polymer having an average particle size of about 0.1 to about 10 µm and about 80 to about 95% by weight of an aromatic vinyl compound; and (C) about 50 to about 79 parts by weight of a cyanide vinyl-aromatic vinyl copolymer.

12 Claims, No Drawings

THERMOPLASTIC RESIN COMPOSITION FOR REFRIGERATOR HAVING IMPROVED ENVIRONMENTAL STRESS CRACK RESISTANCE

CROSS REFERENCE TO RELATED APPLICATIONS

This non-provisional application is a continuation-in-part application of PCT Application No. PCT/KR2005/002035, filed Jun. 29, 2005, pending, which designates the U.S. and which is hereby incorporated by reference in its entirety, and also claims priority from Korean Patent Application No. 10-2004-0114011, filed Dec. 28, 2004, which is also hereby incorporated by reference in its entirety.

FIELD OF THE INVENTION

The present invention relates to a thermoplastic resin composition useful for refrigerators.

BACKGROUND OF THE INVENTION

Acrylonitrile-butadiene-styrene copolymers (hereinafter "ABS resins") can be produced by grafting an unsaturated nitrile compound (i.e., an acrylonitrile monomer) and an aromatic vinyl compound (i.e., a styrene monomer) in the presence of a butadiene-based rubber polymer. Generally, desired properties of ABS resins can be achieved by controlling the composition of a rubber polymer, a g-ABS resin or a SAN resin used as a matrix resin therein. The ABS resin prepared therefrom can have good physical properties such as processability, impact resistance, rigidity, and especially excellent coloration property and glossy appearance. Accordingly, ABS resins have been widely used in the production of electric or electronic goods and miscellaneous goods. Increasingly, ABS resins are used in multiple applications, and there are accordingly increasing requirements for multi-functional ABS resins (as compared to mono-functional ABS resins).

Generally, some type of connecting part between an external steel sheet and an internal resin sheet in a refrigerator is manufactured by assembling a table board, a lid and a sash. An insulation layer for a refrigerator can be formed by injecting polyurethane forming liquid in the space between an internal box and an external box of the assembled refrigerator and allowing the liquid to foam and solidify in place. The primary components of the polyurethane foam-insulation layer can include a mixture of a polyol and a diisocyanate compound and a foaming agent, such as freon.

However, compounds used in the polyurethane foam-insulation layer may cause chemical erosion at a portion of the internal box of a refrigerator, where stress is concentrated, by contacting the surface of resin during the manufacturing process or while in use, which can result in stress cracking. Therefore, the resin composition used in the manufacture a refrigerator should have stress cracking resistance against these chemical compounds.

ABS resins have been typically used in the manufacture of an internal box of a refrigerator, because ABS resins can have a good balance of physical properties such as rigidity, impact resistance, processability, glossy appearance, and especially excellent chemical resistance against a freon such as CFC-11 which is used as a foaming agent for a rigid polyurethane foam. CFC-11 is being replaced with HCFC-141b at the present time, because of environmental concerns associated with the impact of CFC-11 on the ozone layer in the stratosphere. However, the use of HCFC-141b can also be problematic as a result of possible stress cracks that can appear on the internal box of a refrigerator by melting the resin component.

In order to solve the above problem, Japanese Patent Application Laid-Open No. 2-284906 is directed to an internal box of a refrigerator formed with an ABS resin containing a high amount of a vinyl cyanide compound, and Japanese Patent Application Laid-Open No. 6-262713 is directed to a method of mixing acrylic rubber during the compounding process. However, the resins produced therefrom are susceptible to stress cracking.

SUMMARY OF THE INVENTION

The present inventors have developed a thermoplastic resin composition that can be useful in the production of refrigerator parts or components. The thermoplastic resin composition can have good environmental stress crack resistance, easy vacuum formability, excellent crack resistance and thermal stability. The thermoplastic resin compositions of the invention can include an acrylonitrile-butadiene-styrene graft copolymer resin prepared from rubber polymers having a specific average particle size, a styrenic copolymer, and a cyanide vinyl-aromatic vinyl copolymer.

The thermoplastic resin composition useful for the manufacture of a refrigerator component according to the present invention can include (A) about 20 to about 40 parts by weight of an acrylonitrile-butadiene-styrene graft copolymer resin (g-ABS) prepared by grafting in emulsion polymerization about 60 to about 30% by weight of a monomer mixture comprising a cyanide vinyl compound and an aromatic vinyl compound to about 40 to about 70% by weight of a rubber polymer having an average particle size of about 0.1 to about 0.4 µm; (B) about 1 to about 20 parts by weight of a styrenic copolymer comprising ($b_1$) about 0 to about 75% by weight of a styrenic copolymer prepared by copolymerizing about 5 to about 20% by weight of a rubber polymer having an average particle size of about 0.1 to about 10 µm, about 10 to about 30% by weight of a cyanide vinyl compound, and about 65 to about 85% by weight of an aromatic vinyl compound, and ($b_2$) about 25 to about 100% by weight of a styrenic copolymer prepared by copolymerizing about 5 to about 20% by weight of a rubber polymer having an average particle size of about 0.1 to about 10 µm and about 80 to about 95% by weight of an aromatic vinyl compound; and (C) about 50 to about 79 parts by weight of a cyanide vinyl-aromatic vinyl copolymer.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

(A) Acrylonitrile-Butadiene-Styrene Graft Copolymer Resin (g-ABS Resin)

Acrylonitrile-butadiene-styrene graft copolymer resins useful in the present invention can be prepared by grafting in emulsion polymerization about 60 to about 30% by weight of a monomer mixture comprising a cyanide vinyl compound and an aromatic vinyl compound to about 40 to about 70% by weight of a rubber polymer having an average particle size of about 0.1 to about 0.4 µm.

Exemplary rubber polymers can include butadiene rubber, isoprene rubber, butadiene-styrene copolymer, an alkylacrylate rubber, and the like, and mixtures thereof. The average rubber particle size of the rubber polymer is can range from about 0.1 to about 0.4 μm. When the rubber polymer used has an average particle size falling within the above range, the resulting resin composition can have superior impact strength, environmental stress crack resistance and gloss.

The cyanide vinyl compound and the aromatic vinyl compound are well known in the art and are readily commercially available. Also, the cyanide vinyl compound in the monomer mixture may be present in any amount generally known in the art.

In addition, for the g-ABS resin (A), a mixture of two types of g-ABS resins, each prepared from two distinct groups of rubber particles having a different average particle size, can be used. For example, a mixture of g-ABS resins useful in the invention can include ($a_1$) about 0 to about 100% by weight of a g-ABS resin prepared from a rubber polymer having an average particle size of about 0.25 to about 0.4 μm and ($a_2$) about 0 to about 100% by weight of a g-ABS resin prepared from a rubber polymer having an average particle size of about 0.1 to about 0.15 μm.

In the present invention, the g-ABS resin (A) can be used in an amount of about 20 to about 40 parts by weight. If the amount of the g-ABS resin (A) is less than about 20 parts by weight, the resin composition may not obtain sufficient environmental stress crack resistance. On the other hand, if the amount of the g-ABS resin (A) is more than about 40 parts by weight, the flowability of the resin composition can degrade.

(B) Styrenic Copolymer

Styrenic copolymers useful in the present invention can include ($b_1$) about 0 to about 75% by weight of a styrenic copolymer prepared by copolymerizing about 5 to about 20% by weight of a rubber polymer having an average particle size of about 0.1 to about 10 μm, about 10 to about 30% by weight of a cyanide vinyl compound, and about 65 to about 85% by weight of an aromatic vinyl compound, and ($b_2$) about 25 to about 100% by weight of a styrenic copolymer prepared by copolymerizing about 5 to about 20% by weight of a rubber polymer having an average particle size of about 0.1 to about 10 μm and about 80 to about 95% by weight of an aromatic vinyl compound;

The average particle size of the rubber polymer in the styrenic copolymer ($b_1$) useful in the present invention can range from about 0.1 to about 10 μm. When the rubber polymer used has an average particle size falling within the above range, the resulting resin composition can have superior environmental stress crack resistance and glossy appearance.

The content of the cyanide vinyl compound in the styrenic copolymer ($b_1$) can be about 10 to about 30% by weight. If the content of the cyanide vinyl compound is outside of this range, the environmental stress crack resistance of the resin composition can degrade.

In the styrenic copolymer ($b_2$), the average particle size of the rubber polymer can range from about 0.1 to about 10 μm. When the rubber polymer used has an average particle size falling within the above range, the resulting resin composition may have excellent environmental stress crack resistance and glossy appearance.

The content of the cyanide vinyl compound in the styrenic copolymer ($b_2$) can be about 0 to about 10% by weight, thereby the resin composition may have good environmental stress crack resistance and chemical resistance.

The styrenic copolymer (B) useful in the present invention can include about 0 to about 75% by weight of the styrenic copolymer ($b_1$) and about 25 to about 100% by weight of the styrenic copolymer ($b_2$) for the purpose of securing good environmental stress crack resistance.

The styrenic copolymer ($b_2$) can be present in an amount of about 1 to about 10 parts by weight per 100 parts by weight of total resin composition to provide good environmental stress crack resistance, impact strength and tensile strength.

The styrenic copolymer (B) useful in the present invention can be used in an amount of about 1 to about 20 parts by weight. If the amount of the styrenic copolymer (B) is less than about 1 part by weight, the resin composition may not obtain sufficient crack resistance. If the amount of the styrenic copolymer (B) is more than about 20 parts by weight, the molecular weight of the total resin composition can decrease, which can make it difficult to obtain good vacuum formability.

(C) Cyanide Vinyl-Aromatic Vinyl Copolymer

Cyanide vinyl-aromatic vinyl copolymers (C) useful in the present invention can be used in an amount of about 50 to about 79 parts by weight. The cyanide vinyl-aromatic vinyl copolymer (C) can be used alone or as a mixture of at least two distinct groups of cyanide vinyl-aromatic vinyl copolymers having a different molecular weight.

Cyanide vinyl-aromatic vinyl copolymers (C) useful in the present invention can include ($c_1$) about 0 to about 100% by weight of a cyanide vinyl-aromatic vinyl copolymer including about 25 to about 40% by weight of a cyanide vinyl compound and having a weight average molecular weight ($M_w$) of about 50,000 to about 150,000 and ($c_2$) about 100 to about 0% by weight of a cyanide vinyl-aromatic vinyl copolymer including about 20 to about 30% by weight of cyanide vinyl compound and having a weight average molecular weight ($M_w$) of about 150,000 to about 1,000,000.

The weight average molecular weight of the copolymer ($c_1$) can be at least about 50,000 to obtain sufficient environmental stress crack resistance. Further, in order to make processing easier and to have a good appearance, the weight average molecular weight of the copolymer ($c_2$) is not more than about 1,000,000.

In the present invention, a mixture including about 34 to about 66% by weight of copolymer ($c_1$) and about 34 to about 66% by weight of copolymer ($c_2$) can be used.

The cyanide vinyl-aromatic vinyl copolymer (C) useful in the present invention can be used in an amount of about 50 to about 79 parts by weight. If the amount of the cyanide vinyl-aromatic vinyl copolymer (C) is less than about 50 parts by weight, the flowability of the resin composition can deteriorate. If the amount of the cyanide vinyl-aromatic vinyl copolymer (C) is more than about 79 parts by weight, the resin composition may not obtain sufficient crack resistance.

Other additives may be included in the resin composition of the present invention. Exemplary additives can include a lubricant, a releasing agent, a light stabilizer, an UV stabilizer, a flame retardant, an antistatic agent, a colorant, a filler, an impact modifier, and the like, as well as mixtures thereof. Also, other resins or other rubber components can be included therein.

The present invention may be better understood by reference to the following examples that are intended for the purpose of illustration and are not to be construed as in any way limiting the scope of the present invention, which is defined in the claims appended hereto. In the following examples, all parts and percentage are by weight unless otherwise indicated.

EXAMPLES

Each component of (A), (B) and (C) used in Examples and Comparative Examples is as Follows
(A) g-ABS Resin
  ($a_1$) g-ABS resin having core-shell structure prepared by grafting in emulsion polymerization with a rubber polymer having an average particle size of 0.32 µm is used.
  ($a_2$) g-ABS resin having core-shell structure prepared by grafting in emulsion polymerization with a rubber polymer having an average particle size of 0.13 µm is used.
(B) Styrenic Copolymer Resin
  ($b_1$) Styrenic copolymer resin prepared by copolymerizing 7% by weight of a polybutadiene having an average particle size of 2 µm, 25% by weight of an acrylonitrile, and 68% by weight of a styrene is used.
  ($b_2$) Styrenic copolymer resin prepared by copolymerizing 10% by weight of a polybutadiene having an average particle size of 0.6 µm and 90% by weight of a styrene is used.
(C) Cyanide Vinyl-Aromatic Vinyl Copolymer
  ($c_1$) SAN resin containing 40% by weight of acrylonitrile, and having a weight average molecular weight of 120,000 is used.
  ($c_2$) SAN resin containing 25% by weight of acrylonitrile, and having a weight average molecular weight of 450,000 is used.

Examples 1-7

The components as shown in Table 1 are mixed and the mixture is extruded through a twin screw extruder with L/D=29 and Φ=40 mm in pellets. The pellets are molded into test specimens using an injection molding machine at 230° C. The test results are shown in Table 2.

Comparative Examples 1-3

Comparative Example 1 is conducted in the same manner as in Example 1 except that both styrenic copolymer resins ($b_1$ and $b_2$) are not used.

Comparative Example 2 is conducted in the same manner as in Example 1 except that the styrenic copolymer resin ($b_2$) is not used.

Comparative Examples 3 is conducted in the same manner as in Example 1 except that the styrenic copolymer resins (B) is used out of the range of the present invention.

TABLE 1

|   |        | Examples |    |    |    |    |    |    | Comparative Examples |    |    |
|---|--------|----|----|----|----|----|----|----|----|----|----|
|   |        | 1  | 2  | 3  | 4  | 5  | 6  | 7  | 1  | 2  | 3  |
| A | ($a_1$) | 20 | 15 | 30 | 25 | 25 | 25 | 25 | 25 | 25 | 25 |
|   | ($a_2$) | 10 | 15 | —  | 5  | 5  | 5  | 5  | 5  | 5  | 5  |
| B | ($b_1$) | 1  | 7  | 3  | 3  | 1  | 1  | —  | —  | 3  | 15 |
|   | ($b_2$) | 3  | 8  | 1  | 2  | 3  | 3  | 3  | —  | —  | 10 |
| C | ($c_1$) | 31 | 23 | 31 | 30 | 66 | —  | 32 | 35 | 32 | 20 |
|   | ($c_2$) | 35 | 32 | 35 | 35 | —  | 66 | 35 | 35 | 35 | 25 |

The mechanical properties of the test specimens of Examples and Comparative Examples are measured as follow and the test results are shown in Table 2

(1) IZOD impact strength (kg cm/cm): The notch Izod impact strength is measured in accordance with ASTM D256 (¼" notched).

(2) Flow Index (g/10 min): The flow index is determined in accordance with ASTM D1238 (10 kg, 220° C.).

(3) Gloss (%): Gloss values are determined at an angle of 60° using a gloss meter.

(4) Environmental Stress Crack Resistance (ESCR): A test piece in a size of 150×20×1.6 mm is molded using an injection molding machine under 230° C. controlling the injection speed at 10% so as not to form a burr and processed into a tensile specimen. The specimen is set on a jig where 6% of a stress is loaded to the test piece. Then, polypropylene glycol (hereinafter, "PPG"), methylene diphenyl diisocyanate (hereinafter, "MDI") and cyclopentane (hereinafter, "CP") are applied to the test piece respectively. Each specimen is left for 5 hours. ESCR is measured in accordance with ASTM D638. It is generally believed that the values of less than 5 indicate poor environmental stress crack resistance. The value required for a sample to have crack resistance is considered to be at least 10.

(5) HCFC-141b test (sec): A test piece in the size of 150× 20×1.6 mm prepared as the same as the above is set on a jig where 6% of a stress is loaded to the test piece. Then, HCFC-141b is applied to the test piece, and the time required for cracking on the test piece to appear is determined.

TABLE 2

|  |  | Examples |  |  |  |  |  |  | Comparative Examples |  |  |
|---|---|---|---|---|---|---|---|---|---|---|---|
|  |  | 1 | 2 | 3 | 4 | 5 | 6 | 7 | 1 | 2 | 3 |
| IZOD impact strength | | 29 | 25 | 41 | 33 | 31 | 36 | 34 | 32 | 38 | 22 |
| Flow Index | | 4.32 | 4.53 | 3.53 | 4.28 | 4.64 | 2.35 | 4.23 | 4.18 | 4.15 | 6.74 |
| Gloss (%) | | 87 | 75 | 90 | 87 | 89 | 81 | 91 | 93 | 90 | 65 |
| ESCR | PPG | 15.3 | 11.3 | 15.7 | 15.3 | 15.4 | 10.9 | 14.8 | 11.2 | 11.8 | 10.3 |
|  | MDI | 9.3 | 9.5 | 9.7 | 9.1 | 8.4 | 10.5 | 9.8 | 7.2 | 8.6 | 9.2 |
|  | CP | 13.2 | 15.7 | 12.1 | 12.8 | 13.4 | 11.5 | 12.8 | 8.6 | 9.6 | 13.4 |
| HCFC-141b test (sec) | | 110 | 500 | 65 | 80 | 170 | 150 | 100 | 20 | 25 | 500 |

As shown in Table 2, Comparative Example 1, in which a styrenic copolymer resin (B) is not used, demonstrates that the environmental stress crack resistance and chemical resistance are degraded. Comparative Example 2, in which styrenic copolymer resin ($b_2$) is not used, demonstrates that the environmental stress crack resistance against PPG and MDI deteriorates. Comparative Example 3, in which excessive styrenic copolymer resin (B) is used, demonstrates that impact strength, flow index and gloss significantly deteriorate.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A thermoplastic resin composition for refrigerator components comprising:
    (A) about 20 to about 40 parts by weight of a cyanide vinyl-rubber polymer-aromatic vinyl graft copolymer resin prepared by grafting in emulsion polymerization about 60 to about 30% by weight of a monomer mixture comprising a cyanide vinyl compound and an aromatic vinyl compound to about 40 to about 70% by weight of a rubber polymer having an average particle size of about 0.1 to about 0.4 μm;
    (B) about 1 to about 20 parts by weight of an aromatic vinyl copolymer comprising a mixture of ($b_1$) about 0 to about 75% by weight of an aromatic vinyl copolymer prepared by copolymerizing about 5 to about 20% by weight of a rubber polymer having an average particle size of about 0.1 to about 10 μm, about 10 to about 30% by weight of a cyanide vinyl compound, and about 65 to about 85% by weight of an aromatic vinyl compound, and ($b_2$) about 25 to about 100% by weight of an aromatic vinyl copolymer prepared by copolymerizing about 5 to about 20% by weight of a rubber polymer having an average particle size of about 0.1 to about 10 μm and about 80 to about 95% by weight of an aromatic vinyl compound, wherein the aromatic vinyl copolymer ($b_2$) comprises 0% by weight of a cyanide vinyl compound; and
    (C) about 50 to about 79 parts by weight of a cyanide vinyl-aromatic vinyl copolymer.

2. The thermoplastic resin composition of claim 1, wherein said cyanide vinyl-rubber polymer-aromatic vinyl graft copolymer (A) comprises at least one acrylonitrile-butadiene-styrene graft copolymer selected from the group consisting of ($a_1$) g-ABS resin prepared from a rubber polymer having an average particle size of about 0.25 to about 0.4 μm and ($a_2$) g-ABS resin prepared from a rubber polymer having an average particle size of about 0.1 to about 0.15 μm.

3. The thermoplastic resin composition of claim 1, wherein said rubber polymer is polybutadiene.

4. The thermoplastic resin composition of claim 1, wherein said aromatic vinyl copolymer ($b_2$) is present in an amount of about 1 to about 10 parts by weight per 100 parts by weight of total resin composition.

5. The thermoplastic resin composition of claim 1, wherein said cyanide vinyl-aromatic vinyl copolymer (C) comprises at least one cyanide vinyl-aromatic vinyl copolymer selected from the group consisting of ($c_1$) cyanide vinyl-aromatic vinyl copolymer comprising about 25 to about 40% by weight of a cyanide vinyl compound and having a weight average molecular weight ($M_w$) of about 50,000 to about 150,000 and ($c_2$) cyanide vinyl-aromatic vinyl copolymer comprising about 20 to about 30% by weight of a cyanide vinyl compound and having a weight average molecular weight ($M_w$) of about 150,000 to about 1,000,000.

6. The thermoplastic resin composition of claim 1, further comprising an additive selected from the group consisting of a lubricant, a releasing agent, a light stabilizer, an UV stabilizer, a flame retardant, an antistatic agent, a colorant, a filler, an impact modifier and a mixture thereof.

7. The thermoplastic resin composition of claim 1, wherein the aromatic vinyl copolymer ($b_2$) consists essentially of said rubber polymer and said aromatic vinyl compound.

8. The thermoplastic resin composition of claim 1, wherein said aromatic vinyl copolymer ($b_2$) is present in an amount of 1 to 8 parts by weight per 100 parts by weight of (A), (B) and (C).

9. The thermoplastic resin composition of claim 8, wherein said aromatic vinyl copolymer ($b_1$) is present.

10. The thermoplastic resin composition of claim 8, wherein said aromatic vinyl copolymer ($b_2$) is present in an amount of 1 to 3 parts by weight per 100 parts by weight of (A), (B) and (C).

11. The thermoplastic resin composition of claim 10, wherein said aromatic vinyl copolymer ($b_1$) is present.

12. The thermoplastic resin composition of claim 1, wherein said aromatic vinyl copolymer (B) comprises a mixture of 25 to 75% by weight of ($b_1$) and 75 to 25% by weight of ($b_2$).

* * * * *